United States Patent
Ogaki et al.

(10) Patent No.: US 10,583,746 B2
(45) Date of Patent: Mar. 10, 2020

(54) VEHICLE POWER SOURCE SYSTEM

(71) Applicant: HONDA MOTOR CO., LTD., Tokyo (JP)

(72) Inventors: Toru Ogaki, Saitama (JP); Masanori Matsuda, Saitama (JP); Shinji Wada, Saitama (JP); Ryu Tate, Saitama (JP); Yasutomo Kashiwakura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/791,718

(22) Filed: Oct. 24, 2017

(65) Prior Publication Data

US 2018/0111500 A1   Apr. 26, 2018

(30) Foreign Application Priority Data

Oct. 25, 2016   (JP) .................................. 2016-209014

(51) Int. Cl.
*B60K 11/02* (2006.01)
*B60L 11/18* (2006.01)
(Continued)

(52) U.S. Cl.
CPC ............. *B60L 11/1874* (2013.01); *B60K 1/04* (2013.01); *B60K 11/02* (2013.01); *B60K 11/04* (2013.01);
(Continued)

(58) Field of Classification Search
CPC ...... B60K 2001/003; B60K 2001/0416; B60K 2001/0422; B60K 2001/0433; B60K 2001/0438
See application file for complete search history.

(56) References Cited

U.S. PATENT DOCUMENTS 6,595,433 B2 *   7/2003   Ap ........................... B60K 1/04
                                                      237/12.3 B
7,957,169 B2 *   6/2011   Nakajima .......... H05K 7/20927
                                                         363/141
(Continued)

FOREIGN PATENT DOCUMENTS

CN           1899883 A       1/2007
CN         102216100 A      10/2011
(Continued)

OTHER PUBLICATIONS

May 29, 2018, Japanese Office Action issued for related JP Application No. 2016-209014.

(Continued)

*Primary Examiner* — Jeffrey J Restifo
(74) *Attorney, Agent, or Firm* — Paratus Law Group, PLLC (57) ABSTRACT

A vehicle power source system includes a plurality of module groups each including a plurality of battery modules and disposed separately from each other, and a cooling circuit including a plurality of module group cooling units which are configured to respectively cool the plurality of module groups. The plurality of module group cooling units are connected in series. Each of the plurality of module group cooling units includes a plurality of module cooling units, each of which is configured to cool one or more of the battery modules. In each of the plurality of module group cooling units, the plurality of module cooling units are connected in parallel.

10 Claims, 8 Drawing Sheets

(51) Int. Cl.
*B60K 11/04* (2006.01)
*B60L 58/26* (2019.01)
*B60L 50/60* (2019.01)
*H01M 10/613* (2014.01)
*H01M 10/625* (2014.01)
*H01M 10/6568* (2014.01)
*B60K 1/04* (2019.01)
*B60K 1/00* (2006.01)

(52) U.S. Cl.
CPC .............. *B60L 50/66* (2019.02); *B60L 58/26* (2019.02); *H01M 10/613* (2015.04); *H01M 10/625* (2015.04); *H01M 10/6568* (2015.04); *B60K 2001/003* (2013.01); *B60K 2001/005* (2013.01); *B60K 2001/0411* (2013.01); *B60K 2001/0416* (2013.01); *B60K 2001/0433* (2013.01); *B60K 2001/0438* (2013.01); *B60L 2240/545* (2013.01); *H01M 2220/20* (2013.01); *Y02T 10/705* (2013.01); *Y02T 10/7005* (2013.01)

(56) References Cited

U.S. PATENT DOCUMENTS

| | | | | |
|---|---|---|---|---|
| 8,151,917 | B2* | 4/2012 | Suzuki | B60K 6/445 |
| | | | | 180/65.275 |
| 8,855,851 | B2* | 10/2014 | Nishizawa | B60L 1/003 |
| | | | | 701/29.5 |
| 8,875,820 | B2* | 11/2014 | Yamashita | E02F 9/2095 |
| | | | | 165/104.33 |
| 8,919,471 | B2* | 12/2014 | Oberti | B60K 1/00 |
| | | | | 180/68.4 |
| 9,410,473 | B2* | 8/2016 | Cregut | B60K 11/02 |
| 9,464,561 | B2* | 10/2016 | Nguyen | B60K 6/22 |
| 9,540,055 | B2* | 1/2017 | Berger | B60L 11/1874 |
| 9,561,704 | B2* | 2/2017 | Enomoto | B60H 1/00485 |
| 9,643,469 | B2* | 5/2017 | Kakehashi | B60K 11/02 |
| 9,796,293 | B2* | 10/2017 | Ito | B60L 11/1877 |
| 9,847,734 | B1* | 12/2017 | Lei | B60K 6/365 |
| 9,878,594 | B2* | 1/2018 | Enomoto | B60L 1/003 |
| 10,065,478 | B2* | 9/2018 | Makihara | B60K 11/02 |
| 10,166,835 | B2* | 1/2019 | Kim | B60H 1/00278 |
| 2002/0053216 | A1* | 5/2002 | Ap | B60K 1/04 |
| | | | | 62/323.1 |
| 2007/0040418 | A1 | 2/2007 | Ohkuma et al. | |
| 2008/0062622 | A1* | 3/2008 | Fukazu | B60K 1/04 |
| | | | | 361/678 |
| 2008/0196957 | A1 | 8/2008 | Koike et al. | |
| 2008/0276825 | A1* | 11/2008 | King | B60K 6/405 |
| | | | | 105/50 |
| 2008/0295535 | A1* | 12/2008 | Robinet | B60H 1/00278 |
| | | | | 62/259.2 |
| 2011/0020686 | A1 | 1/2011 | Yamamoto et al. | |
| 2011/0222240 | A1 | 9/2011 | Kawata et al. | |
| 2013/0056194 | A1* | 3/2013 | Cregut | B60K 11/02 |
| | | | | 165/300 |
| 2014/0339009 | A1* | 11/2014 | Suzuki | B60K 1/00 |
| | | | | 180/232 |
| 2016/0090002 | A1 | 3/2016 | Noack | |
| 2016/0355100 | A1* | 12/2016 | Ito | B60L 11/1877 |
| 2017/0305293 | A1* | 10/2017 | Takizawa | B60K 1/04 |

FOREIGN PATENT DOCUMENTS

| | | |
|---|---|---|
| CN | 105284001 A | 1/2016 |
| DE | 102010002289 A1 | 9/2010 |
| JP | 2001-138753 A | 5/2001 |
| JP | 2002-144888 A | 5/2002 |
| JP | 2008-062781 A | 3/2008 |
| JP | 2010-529920 A | 9/2010 |
| JP | 2013-105687 A | 5/2013 |
| JP | 2013-173389 A | 9/2013 |
| JP | 2016-132314 A | 7/2016 |
| JP | 2016-179747 A | 10/2016 |
| WO | WO 2016/088474 A1 | 6/2016 |
| WO | WO 2016/088475 A1 | 6/2016 |

OTHER PUBLICATIONS

Nov. 4, 2019, Chinese Office Action issued for related CN Application No. 201710968915.5.

* cited by examiner

VEHICLE POWER SOURCE SYSTEM

CROSS-REFERENCE TO RELATED APPLICATIONS

The present application claims the benefit of priority of Japanese Patent Application No. 2016-209014, filed on Oct. 25, 2016, the content of which is incorporated herein by reference.

TECHNICAL FIELD

The present invention relates to a vehicle power source system which is provided on a hybrid vehicle, an electric vehicle or the like.

BACKGROUND ART

JP-A-2013-173389 discloses an electric vehicle which includes a front battery pack having four module groups configured by a plurality of battery cells and a rear battery pack having four module groups configured by a plurality of battery cells, wherein the front battery pack and the rear battery pack are cooled by a same cooling circuit.

Specifically, in the electric vehicle disclosed in JP-A-2013-173389, a front cooling jacket for cooling the front battery pack and a rear cooling jacket for cooling the rear battery pack are connected in parallel.

SUMMARY

However, in a case where the front cooling jacket for cooling the front battery pack and the rear cooling jacket for cooling the rear battery pack are connected in parallel, a cooling pump is required to supply a flow rate which a sum of flow rates required for both of the two battery packs. Therefore, a large cooling pump is needed, which would cause deterioration in vehicle mountability.

Further, in the electric vehicle disclosed in JP-A-2013-173389, each of the front cooling jacket and the rear cooling jacket is provided at a center of the four module groups, and there is a room for improvement in cooling efficiency.

The present invention has been made in view of the above circumstances, and an object thereof is to provide a vehicle power source system with excellent vehicle mountability and higher cooling efficiency.

(1) According to an aspect of the present invention, there is provided a vehicle power source system (for example, a vehicle power source system 1 in an embodiment described below) including:

a first module group (for example, a front module group 31 in the embodiment) including a plurality of battery modules (for example, battery modules 30*a* in the embodiment);

a second module group (for example, a middle module group 32 in the embodiment) including a plurality of battery modules (for example, battery modules 30*a* in the embodiment) and disposed separately from the first module group; and a cooling circuit (for example, a cooling circuit 100 in the embodiment) including:

a first module group cooling unit (for example, a front module group cooling unit 131 in the embodiment) which is configured to cool the first module group; and a second module group cooling unit (for example, a middle module group cooling unit 132 in the embodiment) which is configured to cool the second module group, wherein the first module group cooling unit and the second module group cooling unit are connected in series, wherein each of the first module group cooling unit and the second module group cooling unit includes a plurality of module cooling units (for example, cooling jackets 131*a* and cooling jackets 132*a* in the embodiment), each of which is configured to cool one or more of the battery modules (for example, a battery module 30*a* in the embodiment), wherein the plurality of module cooling units of the first module group cooling unit are connected in parallel, and wherein the plurality of module cooling units of the second module group cooling unit are connected in parallel.

(2) The above vehicle power source system may further include:

a high-voltage equipment (for example, a high-voltage equipment 20 in the embodiment), and wherein the cooling circuit may further include:

a high-voltage equipment cooling unit (for example, a high-voltage equipment cooling unit 120 in the embodiment) which is disposed at a downstream side of the first module group cooling unit and the second module group cooling unit and is configured to cool the high-voltage equipment; and a bypass flow path (for example, a bypass flow path 105 in the embodiment) which is configured to connect an upstream side of the first module group cooling unit and the second module group cooling unit to an upstream side of the high-voltage equipment and the downstream side of the first module group cooling unit and the second module group cooling unit.

(3) In the above vehicle power source system, the cooling circuit may include a flow path switching device (for example, a three-way solenoid valve 106 in the embodiment) provided at the upstream side of the first module group cooling unit and the second module group cooling unit.

(4) in the above vehicle power source system, the high-voltage equipment may include a first high-voltage equipment (for example, a DC-DC converter 22 in the embodiment) and a second high-voltage equipment (for example, a charger 21 in the embodiment) having a greater heat value than that of the first high-voltage equipment, the cooling circuit may include a first high-voltage equipment cooling unit (for example, a DC-DC converter cooling unit 122 in the embodiment) which is configured to cool the first high-voltage equipment and a second high-voltage equipment cooling unit (for example, a charger cooling unit 121 in the embodiment) which is configured to cool the second high-voltage equipment, and the first high-voltage equipment cooling unit and the second high-voltage equipment cooling unit may be connected in series in this order from an upstream side thereof.

(5) The above vehicle power source system may further include:

a third module group (for example, a rear module group 33 in the embodiment) including a plurality of battery modules (for example, battery modules 30*a* in the embodiment), the cooling circuit may further include a third module group cooling unit (for example, a rear module group cooling unit 133 in the embodiment) which is configured to cool the third module group, the third module group cooling unit may include a plurality of module cooling units (for example, cooling jackets 133*a* in the embodiment) each of which is configured to cool one or more of the battery modules, the third module group cooling unit, the second module group cooling unit, and the first module group cooling unit may be connected in series in this order from an upstream side thereof, and the first to third module groups and the first to third module group cooling units may be disposed below a floor panel (for example, a floor panel 3 in the embodiment).

(6) In the above vehicle power source system, a first battery unit (for example, a first battery unit 10 in the embodiment) may include the first module group and the second module group, a second battery unit (for example, a second battery unit 60 in the embodiment) may include the third module group, and the first battery unit and the second battery unit may be independently fixed to a framework member of a vehicle (7) In the above vehicle power source system, the cooling circuit may include a cooling internal piping (for example, an internal piping 104 in the embodiment) provided inside the first battery unit and the second battery unit, and a cooling external piping (for example, an external piping 103 in the embodiment) provided outside the first battery unit and the second battery unit, at least a part of the cooling external piping may be disposed at one vehicle width side of the first battery unit, and the cooling external piping may not be provided at another vehicle width side of the first battery unit.

(8) in the above vehicle power source system, an exhaust pipe may be provided at the other vehicle width side of the first battery unit.

(9) in the above vehicle power source system, the high-voltage equipment be disposed inside the first battery unit, (10) In the above vehicle power source system, the high-voltage equipment and a high-voltage wiring for connecting the high-voltage equipment with the first module group and the second module group may be arranged in a vehicle width center of the first battery unit.

(11) in the above vehicle power source system, the first module group be a front module group (for example, a front module group 31 in the embodiment) disposed below a front seat, the second module group may be a middle module group (for example, a middle module group 32 in the embodiment) disposed below a rear seat, and the third module group may be a rear module group (for example, a rear module group 33 in the embodiment) disposed rear of the vehicle.

(12) in the above vehicle power source system, the plurality of battery modules of the third module group may include a plurality of down-stage battery modules (for example, battery modules 30ad in the embodiment) located at a lower stage and a plurality of upper-stage battery modules (for example, battery modules 30au in the embodiment) located at an upper stage, the plurality of module cooling units for cooling the third module group may include a plurality of down-stage module cooling units (for example, down-stage module cooling units 133d in the embodiment) which are configured to respectively cool the plurality of down-stage battery modules and a plurality of upper-stage module cooling units (for example, upper-stage module cooling units 133u in the embodiment) which are configured to respectively cool the plurality of upper-stage battery modules, the plurality of down-stage module cooling units may be connected in parallel, the plurality of upper-stage module cooling units may be connected in parallel, and the plurality of down-stage module cooling units and the plurality of upper-stage module cooling units may be connected in series.

(13) According to another aspect of the present invention, there is provided a vehicle power source system (for example, a vehicle power source system 1 in the embodiment) including:

a plurality of module groups (for example, a front module group 31, a middle module group 32, and a rear module group 33 in the embodiment) each including a plurality of battery modules and disposed separately from each other; and a cooling circuit (for example, a cooling circuit 100 in the embodiment) including a plurality of module group cooling units (for example, a front module group cooling unit 131, a middle module group cooling unit 132, and a rear module group cooling unit 133 in the embodiment) which are configured to respectively cool the plurality of module groups, wherein the plurality of module group cooling units are connected in series, wherein each of the plurality of module group cooling units includes a plurality of module cooling units (for example, cooling jackets 131a, cooling jackets 132a, and cooling jackets 133a in the embodiment) each of which is configured to cool one or more of the battery modules (for example, a battery module 30a in the embodiment), and wherein in each of the plurality of module group cooling units, the plurality of module cooling units are connected in parallel.

(14) The above vehicle power source system may further include:

a high-voltage equipment (for example, a high-voltage equipment 20 in the embodiment), and wherein the cooling circuit may further include:
 a high-voltage equipment cooling unit (for example, a high-voltage equipment cooling unit 120 in the embodiment) disposed at a downstream side of the plurality of module group cooling units and configured to cool the high-voltage equipment; and
 a bypass flow path (for example, a bypass flow path 105 in the embodiment) which is configured to connect an upstream side of the plurality of the module group cooling units to an upstream side of the high-voltage equipment cooling unit and a downstream side of the plurality of module group cooling units.

Effects

According to an aspect of (1), each of the first module group cooling unit and the second module group cooling unit includes a plurality of module cooling units each of which is configured to cool one or more of the battery modules, and therefore, the cooling efficiency is high. In addition, since the module cooling units are connected in parallel, pressure loss can be reduced compared with a case where the module cooling units are connected in series, and temperature variation can be reduced in the first module group cooling unit and the second module group cooling unit.

In a case where the first module group cooling unit and the second module group cooling unit, in which module cooling units are connected in parallel, are connected in parallel, the number of pipings increases, and a large cooling pump for ensuring a required flow rate is needed, so that the vehicle mountability is worse. However, by connecting the first module group cooling unit and the second module group cooling unit in series, freedom of the vehicle mountability is improved.

According to an aspect of (2), since the high-voltage equipment cooling unit is disposed at the upstream side of the first module group cooling unit and the second module group cooling unit, a battery with a low control temperature (lower heat resistance) can be reliably cooled without being affected by a temperature of the high-voltage equipment even in a situation where both the battery and the high-voltage equipment are cooled. Further, it is possible to only cool the high-voltage equipment as necessary by the bypass flow path bypassing the first module group cooling unit and the second module group cooling unit.

According to an aspect of (3), since the cooling circuit includes a flow path switching device which is provided at the upstream side of the first module group cooling unit and the second module group cooling unit, the temperature of the battery can be controlled appropriately based on the flow path switching control corresponding to a request of the battery.

According to an aspect of (4), since the first high-voltage equipment cooling unit and the second high-voltage equipment cooling unit are connected in series, a flow rate required for each high-voltage equipment can be ensured. In addition, there is no need to provide a distributor, so that an increase in the number of components can be suppressed. The first high-voltage equipment cooling unit for cooling the high-voltage equipment (the first high-voltage equipment) having the smaller heat value is disposed at the upstream side of the second high-voltage equipment cooling unit for cooling the high-voltage equipment (the second high-voltage equipment) having the greater heat value, so that the cooling efficiency can be enhanced.

According to an aspect of (5), since the first to third module groups and the first to third module group cooling units are disposed below the floor panel, a wide space can be ensured in a passenger compartment. Since the cooling circuit is independent of the passenger compartment, the design suitable for respective function can be made.

According to an aspect of (6), since the module groups including different units can be cooled by the same cooling circuit, the number of components and manufacturing cost can be reduced.

According to an aspect of (7), since the cooling external piping is disposed at the one vehicle width side of the first battery unit, the piping can be assembled easily.

According to an aspect of (8), since the cooling external piping is disposed at a side opposite to the exhaust pipe in the vehicle width direction of the first battery unit, an influence of heat caused by the exhaust pipe can be reduced.

According to an aspect of (9), since the high-voltage equipment is disposed inside the first battery unit 10, the first module group cooling unit, the second module group cooling unit, and the high-voltage equipment cooling unit can be aggregated inside the first battery unit. Since a waterproof measure is generally provided in the battery unit, a waterproof function of the high-voltage equipment can be improved by a waterproof function of the battery unit in addition to the waterproof function of the high-voltage equipment.

According to an aspect of (10), since the high-voltage equipment and the high-voltage wiring are disposed at the vehicle width center of the first battery unit, the high-voltage equipment and the high-voltage wiring can be protected from an impact at a side collision. Since the high-voltage equipment and the high-voltage wiring are away from the cooling external piping disposed at the one vehicle width side of the first battery unit, the high-voltage equipment and the high-voltage wiring can also be protected from being wet.

According to an aspect of (11), by allowing a refrigerant flow from the rear of the vehicle to the front of the vehicle, the cooling circuit can be simply configured. By dividing the battery into the first to third module groups and arranging in a front-rear direction of the vehicle, weight balance in the front-rear direction of the vehicle can be distributed properly.

According to an aspect of (12), the plurality of down-stage module cooling units which are connected in parallel and the plurality of upper-stage module cooling units which are connected in parallel are connected in series, so that the pressure loss can be reduced while a flow rate can be suppressed.

According to an aspect of (13), since each of the module group cooling units includes the plurality of module cooling units which are configured to cool one or more of the battery modules, the cooling efficiency is high. Since the module cooling units are connected in parallel, the pressure loss can be reduced compared with a case where the module cooling units are connected in series, and the temperature variation can be reduced in each of the module group cooling units.

Furthermore, in a ease where the module group cooling units in which module cooling units are connected in parallel are connected in parallel, the number of pipings increases, and a large cooling pump for ensuring a required flow rate is needed, so that the vehicle mountability is worse. However, by connecting the module group cooling units in series, the freedom of the vehicle mountability is improved.

According to an aspect of (14), since the high-voltage equipment cooling unit is disposed at the downstream side of the module group cooling unit, the battery with the low control temperature is (lower heat resistance) can be reliably cooled without being affected by the temperature of the high-voltage equipment even in a situation where both the battery and the high-voltage equipment are cooled. Further, it is possible to only cool the high-voltage equipment as necessary by the bypass flow path bypassing the module group cooling units.

DETAILED DESCRIPTION OF EMBODIMENT

Hereinafter, a vehicle power source system according to an embodiment of the present invention will be described based on the accompanying drawings. The drawings should be seen in a direction in which reference numerals appear normal.

[Vehicle Power Source System]

Figure 1:
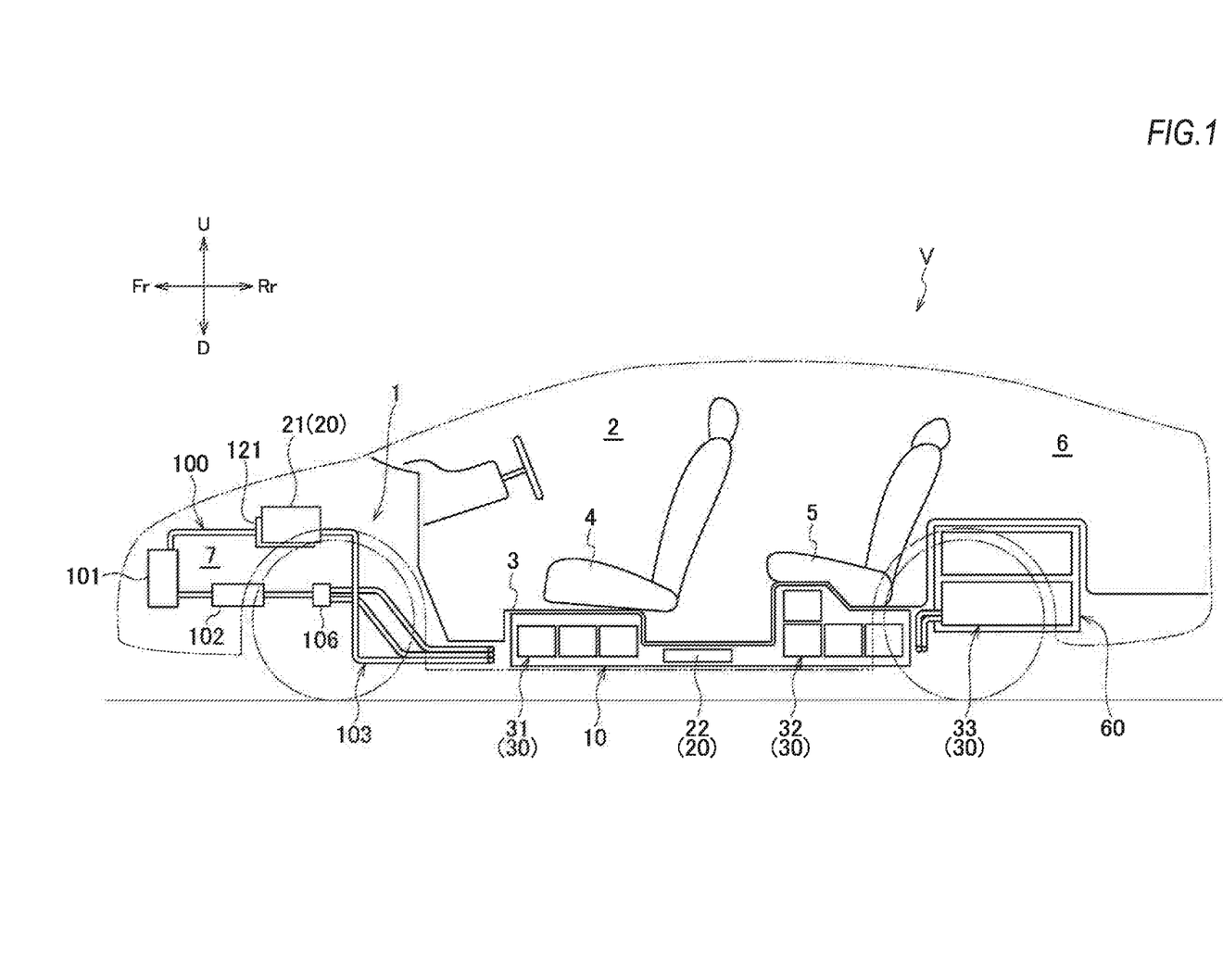
FIG. 1 is a schematic side view of a vehicle on which a vehicle power source system according to an embodiment of the present invention is mounted.

As shown in FIG. 1, a vehicle power source system 1 according to an embodiment of the present invention mainly includes a battery 30, a high-voltage equipment 20, and a cooling circuit 100 for cooling these constituent components and is mounted on a vehicle V such as a hybrid vehicle, an electric vehicle and a fuel cell vehicle.

[Battery]

The battery 30 includes a front module group 31, a middle module group 32, and a rear module group 33 which are disposed separately from each other. A plurality of battery modules 30a in which a plurality of battery cells are stacked in a cuboid shape are disposed collectively in each of the module groups 31 to 33.

Figure 2:
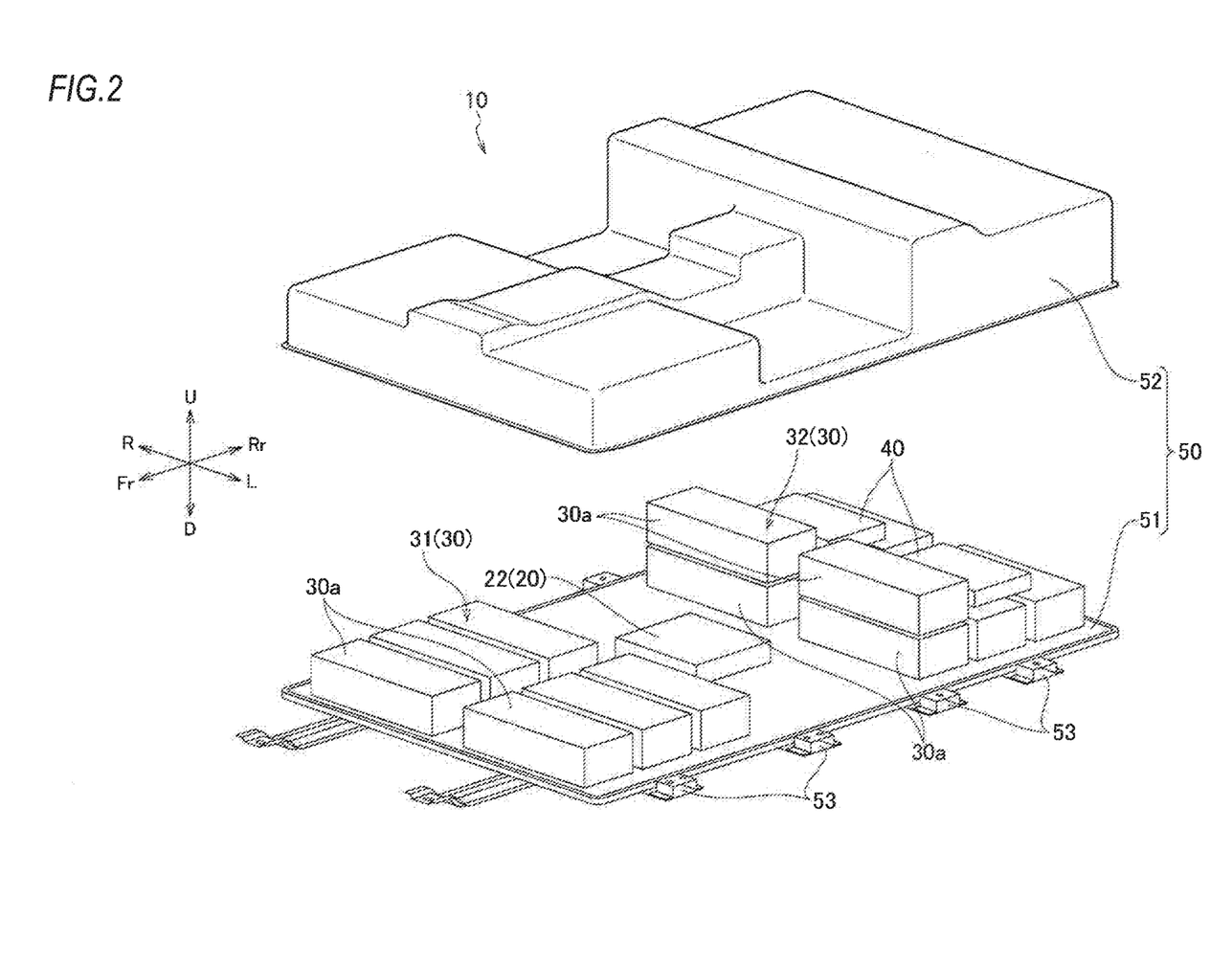
FIG. 2 is an exploded perspective view schematically showing a first battery unit of the vehicle power source system shown in FIG. 1.
Figure 3:
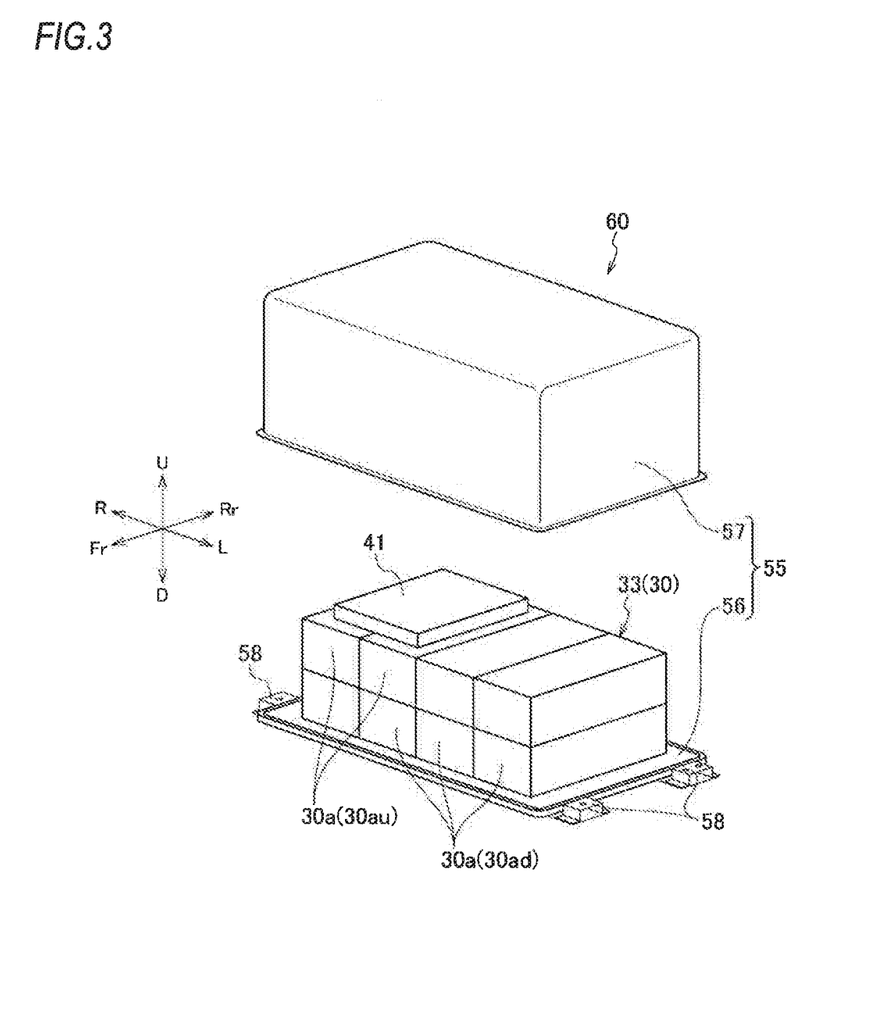
FIG. 3 is an exploded perspective view schematically showing a second battery unit of the vehicle power source system shown in FIG. 1.

Specifically, as shown in FIG. 2, the front module group 31 includes a total of six battery modules 30a which are arranged two in a left-right direction and three in a front-rear direction, while a longitudinal direction of each battery module 30a is directed in the left-right direction (vehicle width direction). As shown in FIG. 2, the middle module group 32 includes a total of eight battery modules 30a in which six battery modules 30a are arranged two in the left-right direction and three in the front-rear direction, and additional two battery modules 30a are respectively arranged on the two battery modules 30a in a frontmost row in the left-right direction, while a longitudinal direction of each battery module 30a is directed in the left-right direction (vehicle width direction). As shown in FIG. 3, the rear module group 33 includes a total of eight battery modules 30a in which four battery modules 30a are arranged in the left-right direction, and additional four battery modules 30a are respectively arranged on the four battery modules 30a, while a longitudinal direction of each battery module 30a is directed in the front-rear direction.

[High-Voltage Equipment]

The high-voltage equipment 20 includes a charger 21 and a DC-DC converter 22. The charger 21 is a high-voltage equipment which charges the battery 30 with electric power supplied from an external power source, and the DC-DC converter 22 is a high-voltage equipment which converts direct current power. The charger 21 and the DC-DC converter 22 are more heat-resistant than the battery 30, and control temperatures thereof are set higher than that of the battery 30. For example, an upper limit temperature of the high-voltage battery 30 is set at 60° C., upper limit temperatures of the charger 21 and the DC-DC converter 22 are set at 80° C., and therefore, under a high-temperature environment, the battery 30 needs to be cooled in higher priority than the charger 21 and the DC-DC converter 22. Incidentally, the charger 21 becomes higher temperature in charging, there may be a situation where the battery 30 does not need to be cooled, and only the charger 21 and the DC-DC converter 22 need to be cooled.

[First Battery Unit]

Figure 4:
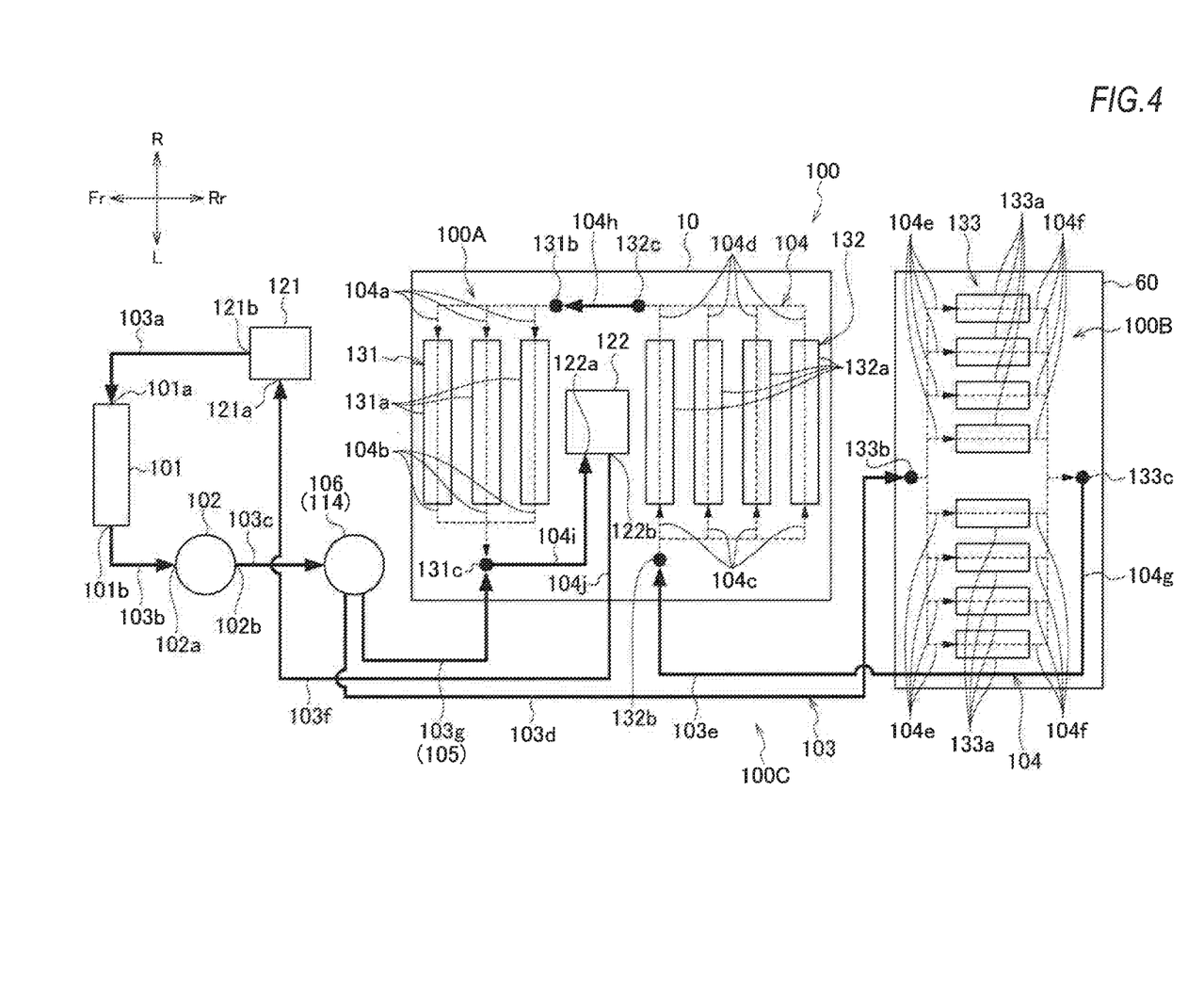
FIG. 4 is a circuit diagram showing a configuration of a cooling circuit of the vehicle power source system according to the embodiment of the present invention.

As shown in FIGS. 1 and 2, the front module group 31, the middle module group 32, the DC-DC converter 22, a part of the cooling circuit 100 (hereinafter, also referred to as an interior cooling circuit 100A), and a case 50 for accommodating those constituent components are unitized to configure a first battery unit 10, which is disposed below a floor panel 3 forming a floor surface of a passenger compartment 2. The interior cooling circuit 100A is shown in FIG. 4.

The case 50 includes a bottom plate 51 on which the front module group 31, the middle module group 32, the DC-DC converter 22 are mounted, and a cover 52 which covers those constituent components from above. A plurality of brackets 53 which extend in the left-right direction below the bottom plate 51 are fastened to bottom faces of a pair of floor frames (not shown) from below which are provided parallel to an inner of side sills provided on both sides of the vehicle V, so that the first battery unit 10 is installed below the floor panel 3.

Accordingly, the first battery unit 10 is fixed to the floor frames (not shown), so that the front module group 31 is disposed below a front seat 4 and the middle module group 32 is disposed below a rear seat 5. The battery modules 30a in the frontmost row of the middle module group 32 in which two battery modules 30a are disposed to be overlapped are located under a front portion of a seat cushion of the rear seat 5. The DC-DC converter 22 is disposed between the front module group 31 and the middle module group 32 at a vehicle width center of the first battery unit 10. A high-voltage wiring (not shown) for connecting the front module group 31 and the middle module group 32 to the DC-DC converter 22 is also disposed at the vehicle width center of the first battery unit 10. Left and right battery ECUs 40 are disposed on the battery modules 30a in a second row and a third row from the front of the middle module group 32. The battery ECUs 40 are battery controllers which control the charging, discharging and temperatures of the front module group 31 and the middle module group 32.

[Second Battery Unit]

As shown in FIGS. 1 and 3, the rear module group 33, a part of the cooling circuit 100 (hereinafter, also referred to as an interior cooling circuit 100B), and a case 55 for accommodating those constituent components are unitized to configure a second battery unit 60, which is disposed below the floor panel 3 forming the floor surface of a luggage compartment 6. The internal cooling circuit 100B is shown in FIG. 4.

The case 55 includes a bottom plate 56 on which the rear module group 33 is mounted, and a cover 57 which covers the rear module group 33 from above. A plurality of brackets 58 which extend in the left-right direction below the bottom plate 56 are fastened to rear frames (not shown) which are formed to surround the second battery unit 60, and the rear frames are fastened to rear side members (not shown), so that the second battery unit 60 is installed below the floor panel 3.

Accordingly, the second battery unit 60 is fixed to the rear side members (not shown), so that the rear module group 33 is disposed below the luggage compartment 6. A battery ECU 41 is disposed on the battery modules 30a of the rear module group 33. The battery ECU 41 is a battery controller which controls the charging, discharging and temperature of the rear module group 33.

[Configuration of Cooling Circuit]

A radiator 101 and a cooling pump 102 which configure the cooling circuit 100 are disposed in a so-called engine room 7 at the front of the first battery unit 10 along with a motor for driving the vehicle (not shown) and the charger 21 which are connected to the battery 30. The cooling circuit 100 is divided into the interior cooling circuit 100A disposed inside the first battery unit 10, the interior cooling circuit 100B disposed inside the second battery unit 60, and an exterior cooling circuit 100O disposed outside the first battery unit 10 and the second battery unit 60.

Figure 5:
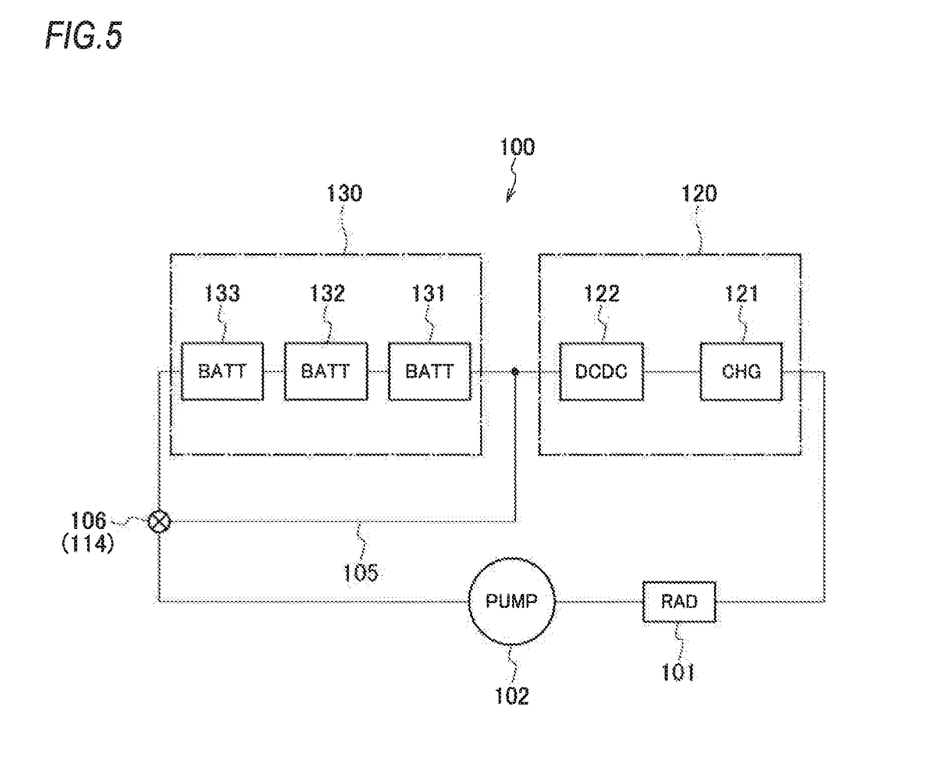
FIG. 5 is a schematic block diagram of the cooling circuit of the vehicle power source system according to the embodiment of the present invention.

As shown in FIGS. 4 and 5, in the cooling circuit 100, the radiator 101, the cooling pump 102, a battery cooling unit 130, a DC-DC converter cooling unit 122, and a charger cooling unit 121 are connected in series by an external piping 103 which is disposed outside the first battery unit 10 and the second battery unit 60, and an internal piping 104 which is disposed inside the first battery unit 10 and the second battery unit 60, so that a refrigerant circulation path is formed.

As shown in FIG. 4, the radiator 101 radiates heat of a refrigerant which flows in from an inlet port 101a and discharges the refrigerant which is cooled by the heat radiation from an outlet port 101b. The inlet port 101a of the radiator 101 is connected to an outlet port 121b of the charger cooling unit 121 via a first external piping 103a. The outlet port 101b of the radiator 101 is connected to a suction port 102a of the cooling pump 102 via a second external piping 103b.

The cooling pump 102 discharges the refrigerant suctioned in from the suction port 102a from a discharge port 102b according to a driving of an electric motor (not shown). The discharge port 102b of the cooling pump 102 is connected to an inlet port 133b of the rear module group 133 described later, which is an inlet port of the battery cooling unit 130, via a third external piping 103c and a fourth external piping 103d.

The battery cooling unit 130 includes a plurality of module group cooling units 131 to 133 for respectively cooling the plurality of module groups 31 to 33. A front module group cooling unit 131 for cooling the front module group 31 is configured such that cooling jackets 131a for cooling each set of two battery modules 30a arranged in the left-right direction are arranged three in the front-rear direction, upstream sides of these cooling jackets 131a are connected in parallel via a first internal piping 104a, and downstream sides of these cooling jackets 131a are connected in parallel via a second internal piping 104b.

A middle module group cooling unit 132 for cooling the middle module group 32 is configured such that cooling jackets 132a for cooling each set of two battery modules 30a arranged in the left-right direction are arranged three in the front-rear direction, and a cooling jacket 132a for cooling a set of two battery modules 30a at a second stage is disposed above the frontmost row cooling jackets 132a. Upstream sides of these four cooling jackets 132a are connected in parallel via a third internal piping 104c, and downstream sides of these cooling jackets 132a are connected in parallel via a fourth internal piping 104d. Incidentally, the cooling jacket 132a in the second stage and the three cooling jackets 132a in a first stage are described to be arranged together in FIG. 4.

A rear module group cooling unit 133 for cooling the rear module group 33 is configured such that cooling jackets 133a for cooling each battery module 30a in a first stage are arranged four in the left-right direction, and cooling jackets 133a for cooling each battery module 30a in a second stage thereon are arranged four in the left-right direction. Upstream sides of these eight cooling jackets 133a are connected in parallel via a fifth internal piping 104c, and downstream sides of these cooling jackets 133a are connected in parallel via a sixth internal piping 104f. Incidentally, the four cooling jackets 133a in the second stage and the four cooling jackets 133a in the first stage are described to be arranged together in FIG. 4.

In the battery cooling unit 130, the plurality of module group cooling units 131 to 133 are disposed in series. Specifically, an outlet port 133c of the rear module group cooling unit 133 is connected to an inlet port 132b of the middle module group cooling unit 132 via a seventh internal piping 104g and a fifth external piping 103e, and an outlet port 132c of the middle module group cooling unit 132 is connected to an inlet port 131b of the front module group cooling unit 131 vi an eighth internal piping 104h.

The DC-DC converter cooling unit 122 is a cooling jacket which is incorporated in the DC-DC converter 22 or a cooling jacket which is disposed adjacent to the DC-DC converter 22, and the charger cooling unit 121 is a cooling jacket which is incorporated in the charger 21 or a cooling jacket which is disposed adjacent to the charger 21. The DC-DC converter cooling unit 122 and the charger cooling unit 121 are connected to each other in series and are disposed at a downstream side of the battery cooling unit 130.

Specifically, an inlet port 122a of the DC-DC converter cooling unit 122 is connected to an outlet port 131c of the front module group cooling unit 131 which is an outlet port of the battery cooling unit 130 via a ninth inner piping 104i, and an outlet port 122b of the DC-DC converter cooling unit 122 is connected to an inlet port 121a of the charger cooling unit 121 via a tenth internal piping 104j and a sixth external piping 103f.

In the cooling circuit 100, in connecting the DC-DC converter cooling unit 122 and the charger cooling unit 121 in series, the charger cooling unit 121 for cooling the charger 21 which has a greater heat value than that of the DC-DC converter 22 is disposed at a downstream side of the DC-DC converter cooling unit 122 for cooling the DC-DC converter 22. In general, since a heat value of a charger is greater than that of a DC-DC converter, the DC-DC converter cooling unit 122 and the charger cooling unit 121 are connected in series in this order from the upstream side thereof, so that the DC-DC converter 22 having a smaller heat value is firstly cooled. Accordingly, the cooling efficiency can be enhanced.

Further, in the cooling circuit 100, a bypass flow path 105 is provided which connects an upstream side of the battery cooling unit 130 to an upstream side of the high-voltage equipment cooling unit 120 (the DC-DC converter cooling unit 122 and the charger cooling unit 121) and the downstream side of the battery cooling unit 130. Specifically, a connecting portion between the third external piping 103c and the fourth external piping 103d is referred to as a branch portion 114, and the branch portion 114 is connected to the outlet port 131c of the front module group cooling unit 131 which is the outlet port of the battery cooling unit 130 via a seventh external piping 103g which configures the bypass flow path 105. Then, a three-way solenoid valve 106, which functions as a flow path switching device, is provided at the branch portion 114.

When the three-way solenoid valve 106 is off, the third external piping 103c and the fourth external piping 103d are connected such that the refrigerant discharged from the cooling pump 102 is supplied to the battery cooling unit 130, while the third external piping 103c is disconnected from the bypass flow path 105 (the seventh external piping 103g) such that the direct supply of the refrigerant to the high-voltage equipment cooling unit 120 (the DC-DC converter cooling unit 122 and the charger cooling unit 121) is cut off. When the three-way solenoid valve 106 is on, the third external piping 103c and the bypass flow path 105 (the seventh external piping 103*g*) are connected such that the refrigerant discharged from the cooling pump 102 is directly supplied to the high-voltage equipment cooling unit 120 (the DC-DC converter cooling unit 122 and the charger cooling unit 121), while the third external piping 103*c* is disconnected from the fourth external piping 103*d* such that the supply of the refrigerant to the battery cooling unit 130 is cut off. Incidentally, in FIG. 4, arrows denote flows of the refrigerant, and there is no such situation where both the fourth external piping 103*d* and the bypass flow path 105 (the seventh external piping 103*g*) are connected to the third external piping 103*c*.

As shown in FIG. 4, among the external pipings 103 disposed outside the first battery unit 10 and the second battery unit 60, the fourth external piping 103*d*, the fifth external piping 103*e*, the sixth external piping 103*f*, and the seventh external piping 103*g* are disposed at one vehicle width side of the first battery unit 10 (in FIG. 4, a left side in the vehicle width direction). In other words, the external pipings 103 are not provided at another vehicle width side of the first battery unit 10 (in FIG. 4, a right side in the vehicle width direction). For example, in the hybrid vehicle or the like, an exhaust pipe extending from an engine disposed in the engine room 7 at the front of the vehicle to the rear of the vehicle is preferably arranged at the other vehicle width side of the first battery unit 10 (in FIG. 4, the right side in the vehicle width direction). Therefore, the external pipings 103 in the cooling circuit 100 can be prevented from being heated up by heat caused by the exhaust pipe.

FIG. 5 is a schematic block diagram of the cooling circuit 100 which is described in detail by using FIG. 4, In FIG. 5, CHG denotes the charger cooling unit 121, DCDC denotes the DC-DC converter cooling unit 122, and BATT denote the module group cooling units 131 to 133 (the same in FIGS. 6 to 9 described below).

As shown in FIG. 5, in the cooling circuit 100 of this embodiment, the radiator 101, the cooling pump 102, the battery cooling unit 130, and the high-voltage equipment cooling unit 120 configured by the charger cooling unit 121 and the DC-DC cooling unit 122 are connected in series, and the high-voltage equipment cooling unit 120 is disposed at the downstream side of the battery cooling unit 130. In addition, the upstream side of the battery cooling unit 130 is connected to the upstream side of the high-voltage equipment cooling unit 120 and the downstream side of the battery cooling unit 130 by the bypass flow path 105, and the three-way solenoid valve 106 is provided at the branch portion 114 where the bypass flow path 105 branches off from an upstream-side flow path of the battery cooling unit 130. Further, the battery cooling unit 130 includes the three module group cooling units 131 to 133 which are connected in series, and the high-voltage equipment cooling unit 120 includes the DC-DC converter cooling unit 122 and the charger cooling unit 121 which are connected in series.

[Operation of Cooling Circuit]

Figure 6:
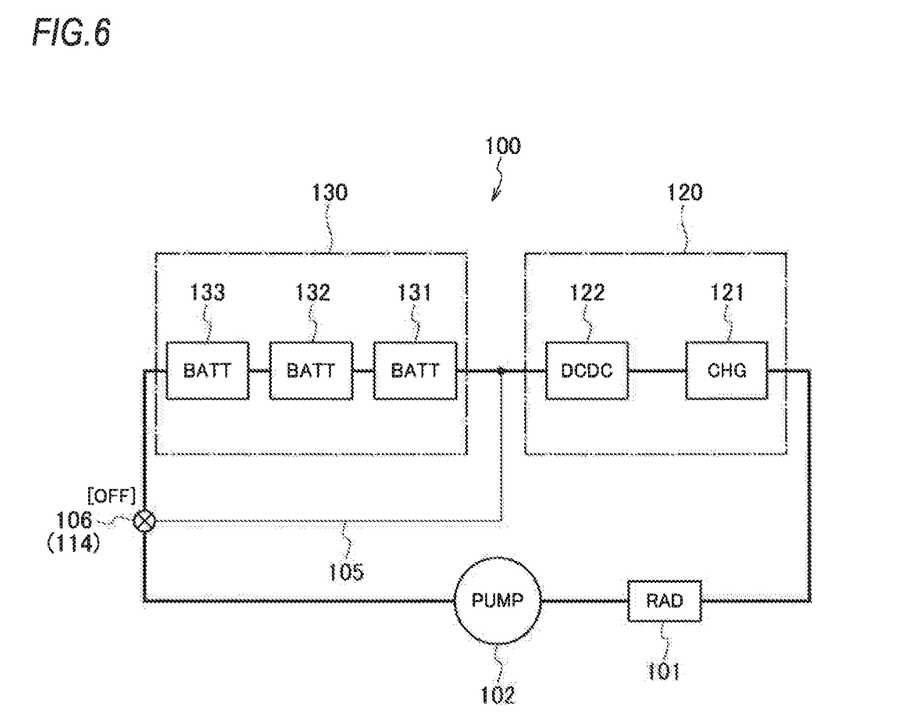
FIG. 6 is a schematic block diagram showing a flow of a refrigerant when a three-way solenoid valve is off in the cooling circuit shown in FIG. 5.
Figure 7:
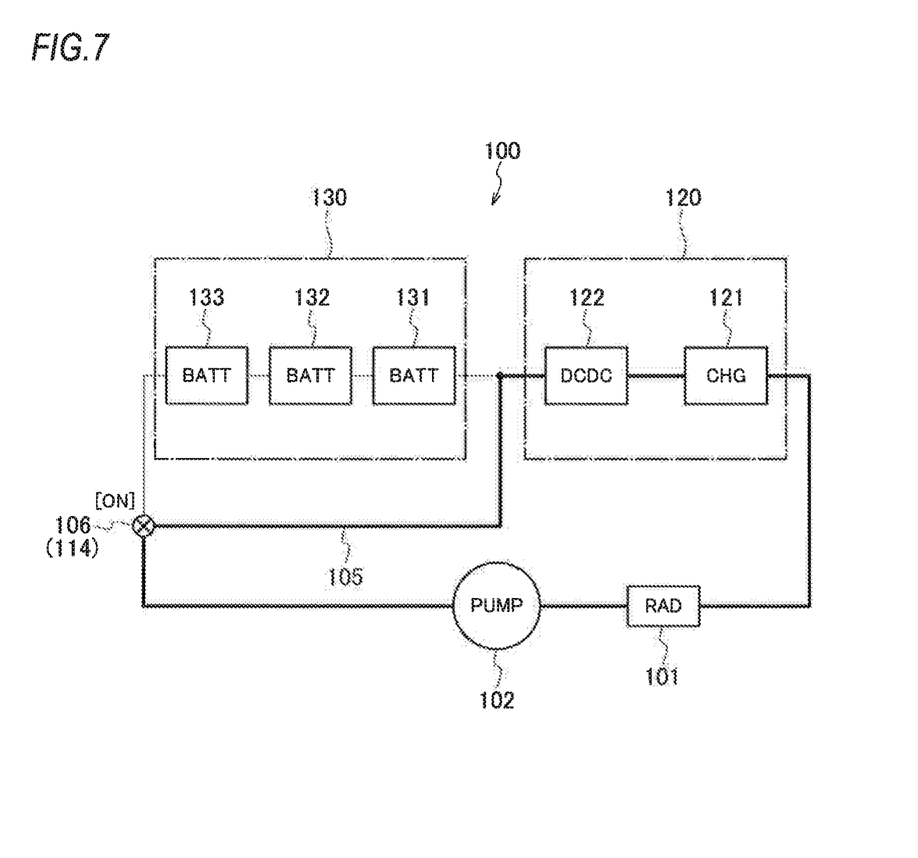
FIG. 7 is a schematic block diagram showing a flow of the refrigerant when the three-way solenoid valve is on in the cooling circuit shown in FIG. 5.

Next, the operation of the cooling circuit 100 will be described mainly by reference to FIGS. 6 and 7. In FIGS. 6 and 7, the flow paths through which the refrigerant flows are denoted by solid lines, whereas the flow paths through which no refrigerant flows are denoted by broken lines.

<Three-Way Solenoid Valve [OFF]>

In the above-described cooling circuit 100, when the cooling pump 102 is driven, the cooling pump 102 suctions the refrigerant of which a temperature is lower from the radiator 101 side and discharges the refrigerant towards the battery cooling unit 130. In a normal state, since the three-way solenoid valve 106 is off, as shown in FIG. 6, the refrigerant discharged from the cooling pump 102 does not flow to the bypass flow path 105 and is supplied to the battery cooling unit 130.

The refrigerant supplied to the battery cooling unit 130 flows to the rear module group cooling unit 133, the middle module group cooling unit 132, and the front module group cooling unit 131 in this order. As described above in FIG. 4, in the module group cooling units 131 to 133, the cooling jackets 131*a* to 133*a* are connected in parallel respectively. That is, since the plurality of cooling jackets 131*a* are connected in parallel in the front module group cooling unit 131, the refrigerant supplied to the front module group cooling unit 131 is distributed to each cooling jacket 131*a* at the inlet port 131*b* of the front module group cooling unit 131, and flows of the refrigerant merge, together at the outlet port 131*c* after passing through each cooling jacket 131*a*. Similarly, the refrigerant supplied to the middle module group cooling unit 132 is distributed to each cooling jacket 132*a* at the inlet port 132*b* of the middle module group cooling unit 132, and flows of the refrigerant merge together in the outlet port 132*c* after passing through each cooling jacket 132*a*. The refrigerant supplied to the rear module group cooling unit 133 is distributed to each cooling jacket 133*a* at the inlet port 133*b* of the rear module group cooling unit 133, and flows of the refrigerant merge together in the outlet port 133*c* after passing through each cooling jacket 133*a*.

Returning to FIG. 6, the refrigerant having passed through the three module group cooling units 131 to 133 flows to the DC-DC converter cooling unit 122 and the charger cooling unit 121 in this order, and returns to the radiator 101 where the refrigerant is cooled.

<Three-Way Solenoid Valve [ON]>

In the cooling circuit 100, when the battery 30 does not need to be cooled or when the DC-DC converter 22 acid the charger 21 need to be cooled although the temperature of the refrigerant is not suitable for the required temperature of the battery 30, the three-way solenoid valve 106 is controlled to be on, so that as shown in FIG. 7, the supply of the refrigerant to the battery cooling unit 130 is cut off, and only the DC-DC converter 22 and the charger 21 can be cooled. That is, when the three-way, solenoid valve 106 is on, the refrigerant discharged from the cooling pump 102 does not flow to the battery cooling unit 130 and is supplied to the bypass flow path 105. After the refrigerant supplied to the bypass flow path 105 bypasses the battery cooling unit 130 and flows to the DC-DC converter cooling unit 122 and the charger cooling unit 121 in this order, the refrigerant returns to the radiator 101 where the refrigerant is cooled.

[Summary]

As has been described above, according to the vehicle power source system 1 of this embodiment, since the module group cooling unit 131 (132, 133) includes the plurality of cooling jackets 131*a* (132*a*, 133*a*), the cooling efficiency is higher compared with a case where one cooling jacket is arranged at the center of the module group 31 (32, 33). In addition, since the cooling jackets 131*a* (132*a*, 133*a*) are connected in parallel, the pressure loss can be reduced compared with a case where the cooling jackets 131*a* (132*a*, 133*a*) are connected in series, and further the temperature variation can be reduced in the module group cooling unit 131 (132, 133). Further, the module group cooling units 131, 132, and 133 in which the cooling jackets 131*a*, 132*a*, and 133*a* are connected in parallel are connected in series, so that freedom of the vehicle mountability is improved, while the temperature variation can be reduced in the module group cooling units 131, 132, and 133 and the cooling efficiency of the cooling circuit 100 can be enhanced.

Since the high-voltage equipment cooling unit 120 is disposed at the downstream side of the battery cooling unit 130 (module group cooling units 131 to 133), the battery 30 with low control temperature (poor heat resistance) can be reliably cooled without being affected by the temperature of the high-voltage equipment 20 even when both the battery 30 and the high-voltage equipment 20 are cooled.

The battery cooling unit 130 (module group cooling units 131, 132, and 133) is bypassed by the bypass flow path 105, which connects the upstream side of the battery cooling unit 130 (module group cooling units 131, 132, and 133) to the upstream side of the high-voltage equipment cooling unit 120 and the downstream side of the battery cooling unit 130 (module group cooling units 131, 132, and 133), so that it is possible to only cool the high-voltage equipment 20 as necessary.

Based on the flow path switching control corresponding to states of the battery 30, the temperature of the battery 30 can be controlled appropriately by the three-way solenoid valve 106 which is provided at the upstream side of the battery cooling unit 130 (module group cooling units 131, 132, and 133).

Since the DC-DC converter cooling unit 122 and the charger cooling unit 121 are connected in series in this order from the upstream side thereof, a flow rate necessary for the charger 21 and the DC-DC converter 22 can be ensured. Further, the DC-DC converter cooling unit 122 for cooling the DC-DC converter having the smaller heat value is disposed at the upstream side of the charger cooling unit 121 for cooling the charger 21 having the greater heat value, so that the cooling efficiency can be enhanced.

By dividing battery 30 into the front module group 31, the middle module group 32, and the rear module group 33, which are arranged in the front-rear direction of the vehicle, weight balance in the front-rear direction of the vehicle can be distributed properly.

Since the module groups 31 to 33 and the module group cooling units 131, 132, and 133 are disposed below the floor panel 3, a wide space in the passenger compartment can be ensured. Further, since the cooling circuit 100 is independent of the passenger compartment 2, the design suitable for respective function can be made.

The module groups 31 to 33 configuring different battery units 10 and 60 can be cooled by the same cooling circuit 100 although the first battery unit 10 including the front module group 31 and the middle module group 32 and the second battery unit 60 including the rear module group 33 are independently fixed to the floor frame, and therefore, the number of components and manufacturing cost can be reduced.

Since the DC-DC converter 22 is disposed inside the first battery unit 10, the front module group cooling unit 131, the middle module group cooling unit 132, and the DC-DC converter cooling unit 122 can be aggregated inside the first battery unit 10. Since a waterproof measure is provided in the first battery unit 10, a waterproof function of the DC-DC converter 22 can be improved by a waterproof function of the first battery unit 10 in addition to the waterproof function of the DC-DC converter 22.

Since the fourth external piping 103*d*, the fifth external piping 103*e*, the sixth external piping 103*f*, and the seventh external piping 103*g* are only disposed at the one vehicle width side of the first battery unit 10, the pipings can be assembled easily.

The DC-DC converter 22, and the high-voltage wiring (not shown) for connecting the front module group 31 and the middle module group 32 to the DC-DC converter 22 are disposed at the vehicle width center of the first battery unit 10, so that the DC-DC converter 22 and high-voltage wiring can be protected from an impact at a side collision. Since the DC-DC converter 22 and high-voltage wiring are away from the fourth external piping 103*d*, the fifth external piping 103*e*, the sixth external piping 103*f*, and the seventh external piping 103*g*, the DC-DC converter 22 and high-voltage wiring can also be protected from being wet.

Since the rear module group cooling unit 133, the middle module group cooling unit 132, and the front module group cooling unit 131 are connected in series in this order from the upstream side thereof, the cooling circuit 100 can be simply configured by allowing the refrigerant flow from the rear of the vehicle to the front of the vehicle.

[Modification]

The present invention is not limited to the embodiment described above and can be modified or improved as required.

For example, in the above-described embodiment, the battery 30 is divided into the front module group 31, the middle module group 32, and the rear module group 33, the front module group 31 and the middle module group 32 are disposed in the first battery unit 10, the rear module group 33 is disposed in the second battery unit 60, and the module groups 31 to 33 are all cooled by the cooling circuit 100. However, other cooling circuits may be provided for the battery units 10 and 60, respectively.

Figure 8:
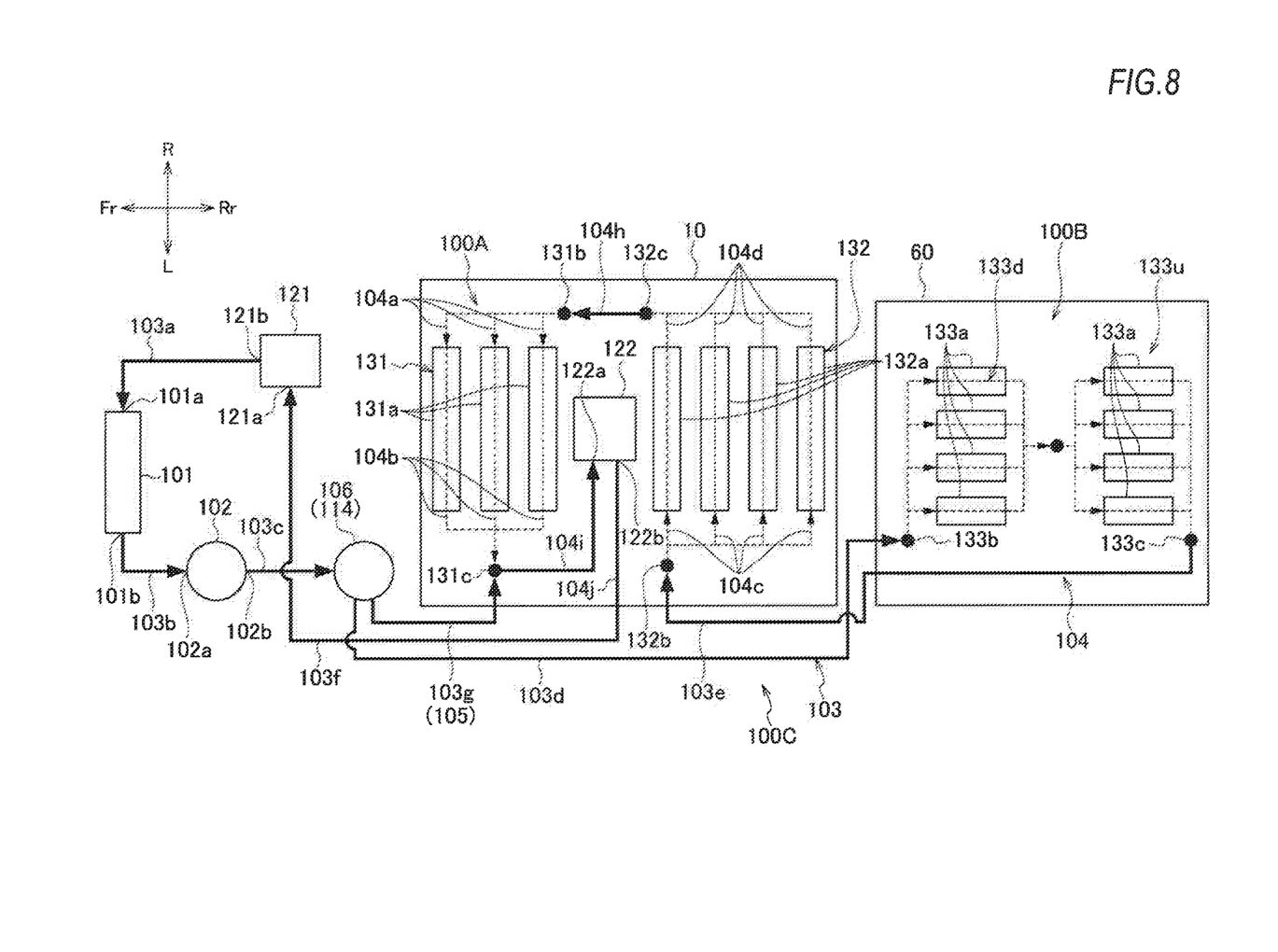
FIG. 8 is a circuit diagram showing a configuration of a cooling circuit of a vehicle power source system according to a modification.

In the interior cooling circuit 100A of the first battery unit 10, the cooling jackets 131*a* and 132*a* of the module group cooling units 131 and 132 are connected in parallel, and the module group cooling unit 131 and the module group cooling unit 132 may be connected in series. FIG. 8 is a vehicle power source system according to a modification, wherein an interior cooling circuit 100B of a second battery unit 60 is different from that of the vehicle power source system in the above-described embodiment.

In the interior cooling circuit 100B of the modification, a rear module group cooling unit 133 for cooling the rear module group 33 includes a plurality of down-stage module cooling units 133*d* for respectively cooling a plurality of battery modules 30*a* located at a lower stage (hereinafter, the battery module 30*a* located at the lower stage is referred to as a battery module 30*ad*), and a plurality of upper-stage module cooling units 133*u* for respectively cooling a plurality of battery modules 30*a* located at an upper stage (hereinafter, the battery module 30*a* located at the upper stage is referred to as a battery module 30*au*). The down-stage module cooling unit 133*d* includes four cooling jackets 133*a* for respectively cooling the battery modules 30*a* at the first stage, and the higher-stage module cooling unit 133*u* includes four cooling jackets 133*a* for respectively cooling the battery modules 30*a* at the second stage.

In the above-described embodiment, the cooling jackets 133*a* of the down-stage module cooling unit 133*d* are connected in parallel, the cooling jackets 133*a* of the upper-stage module cooling unit 133*u* are connected in parallel, and the down-stage module cooling unit 133*d* and the upper-stage module cooling units 133*u* are connected in parallel. However, in the modification, the cooling jackets 133*a* of the down-stage module cooling units 133*d* are connected in parallel, the cooling jackets 133*a* of the upper-stage module cooling units 133*u* are connected in parallel, and the down-stage module cooling units 133d and the upper-stage module cooling units 133u are connected in series.

According to the modification, in the interior cooling circuit 100B, the plurality of down-stage module cooling units 133d which are connected in parallel and the plurality of upper-stage module cooling units 133u which are connected in parallel are connected in series, so that pressure loss can be reduced while a flow rate can be suppressed.

In the above-described embodiment, examples of the high-voltage equipment include the DC-DC converter 22 and the charger 21. However, the high-voltage equipment may include any one of the DC-DC converter 22 and the charger 21, or other high-voltage equipment such as an inverter, or a plurality of the above equipment may be included.

Further, the cooling circuit 100 of the above-described embodiment may be a water-cooled cooling circuit which utilizes water as a refrigerant or an oil-cooled cooling circuit which utilizes oil as a refrigerant.

The invention claimed is:
1. A vehicle power source system comprising:
    a first module group including a plurality of battery modules;
    a second module group including a plurality of battery modules and disposed separately from the first module group;
    a third module group including a plurality of battery modules;
    a high-voltage equipment; and
    a cooling circuit including:
        a first module group cooling unit which is configured to cool the first module group;
        a second module group cooling unit which is configured to cool the second module group;
        a third module group cooling unit which is configured to cool the third module group;
        a high-voltage equipment cooling unit which is disposed at a downstream side of the first module group cooling unit and the second module group cooling unit and is configured to cool the high-voltage equipment; and
        a bypass flow path which is configured to connect an upstream side of the first module group cooling unit and the second module group cooling unit to an upstream side of the high-voltage equipment cooling unit and the downstream side of the first module group cooling unit and the second module group cooling unit,
    wherein the third module group cooling unit, the second module group cooling unit, and the first module group cooling unit are connected in series in this order from an upstream side thereof,
    wherein each of the first module group cooling unit, the second module group cooling unit, and the third module group cooling unit includes a plurality of module cooling units, each of which is configured to cool one or more of the battery modules,
    wherein the plurality of module cooling units of the first module group cooling unit are connected in parallel,
    wherein the plurality of module cooling units of the second module group cooling unit are connected in parallel, and
    wherein the first to third module groups and the first to third module group cooling units are disposed below a floor panel.

2. The vehicle power source system according to claim 1, wherein the cooling circuit includes a flow path switching device provided at the upstream side of the first module group cooling unit and the second module group cooling unit.

3. The vehicle power source system according to claim 1, wherein the high-voltage equipment includes a first high-voltage equipment and a second high-voltage equipment having a greater heat value than that of the first high-voltage equipment,
wherein the cooling circuit further includes a first high-voltage equipment cooling unit which is configured to cool the first high-voltage equipment and a second high-voltage equipment cooling unit which is configured to cool the second high-voltage equipment, and
wherein the first high-voltage equipment cooling unit and the second high-voltage equipment cooling unit are connected in series in this order from an upstream side thereof.

4. The vehicle power source system according to claim 1, wherein a first battery unit includes the first module group and the second module group,
wherein a second battery unit includes the third module group, and
wherein the first battery unit and the second battery unit are independently fixed to a framework member of a vehicle.

5. The vehicle power source system according to claim 4, wherein the cooling circuit further includes a cooling internal piping provided inside the first battery unit and the second battery unit, and a cooling external piping provided outside the first battery unit and the second battery unit,
wherein at least a part of the cooling external piping is disposed at one vehicle width side of the first battery unit, and
wherein the cooling external piping is not provided at another vehicle width side of the first battery unit.

6. The vehicle power source system according to claim 5, wherein an exhaust pipe is provided at the other vehicle width side of the first battery unit.

7. The vehicle power source system according to claim 5, wherein the high-voltage equipment is disposed inside the first battery unit.

8. The vehicle power source system according to claim 7, wherein the high-voltage equipment and a high-voltage wiring for connecting the high-voltage equipment to the first module group and the second module group are disposed at a vehicle width center of the first battery unit.

9. The vehicle power source system according to claim 4, wherein the first module group is a front module group disposed below a front seat,
wherein the second module group is a middle module group disposed below a rear seat, and
wherein the third module group is a rear module group disposed rear of the vehicle.

10. The vehicle power source system according to claim 1,
wherein the plurality of battery modules of the third module group include a plurality of down-stage battery modules located at a lower stage and a plurality of upper-stage battery modules located at an upper stage,
wherein the plurality of module cooling units for cooling the third module group include a plurality of down-stage module cooling units which are configured to respectively cool the plurality of down-stage battery modules and a plurality of upper-stage module cooling units which are configured to respectively cool the plurality of upper-stage battery modules, wherein the plurality of down-stage module cooling units are connected in parallel, wherein the plurality of upper-stage module cooling units are connected in parallel, and wherein the plurality of down-stage module cooling units and the plurality of upper-stage module cooling units are connected in series.

* * * * *